United States Patent [19]

Cain et al.

[11] Patent Number: 4,953,879
[45] Date of Patent: Sep. 4, 1990

[54] MOVABLE DISPLAY RACK

[75] Inventors: Bertram J. Cain, Porage; Wesley S. Devon, Grand Rapids; Ronald F. Patton, Muskegon, all of Mich.

[73] Assignee: Cole's Quality Foods, Inc., Muskegon, Mich.

[21] Appl. No.: 292,389

[22] Filed: Dec. 30, 1988

[51] Int. Cl.$^5$ .............................................. B62B 1/00
[52] U.S. Cl. ............... 280/47.19; 280/47.24; 211/133; 248/175
[58] Field of Search ............... 280/47.19, 47.24, 47.26, 280/47.35, 33.992; 211/133, 153; 248/175, 346

[56] References Cited

U.S. PATENT DOCUMENTS 3,487,951  1/1970  Beltzang ............................. 211/133

FOREIGN PATENT DOCUMENTS 1284501  8/1972  United Kingdom ............. 280/47.19

OTHER PUBLICATIONS

Photographs of Experimental Prototype of Movable Rack Assembly Provided at No Charge to Retail Store and Food Brokers for Experimental Use, Oct.–Dec., 1987 by Cole's Quality Foods, Inc., of Muskegon, Mich., (assignee of the present invention).

Primary Examiner—Charles A. Marmor
Assistant Examiner—Richard M. Camby
Attorney, Agent, or Firm—Price, Heneveld, Cooper, DeWitt & Litton

[57] ABSTRACT

A movable display rack assembly especially adapted to permit loading of products such as bread and other bakery goods in one area of a store followed by movement of the loaded rack assembly to another store location. The display assembly preferably includes a pair of spaced lateral supports, a pair of spaced wheels adjacent the bottom rear of the supports, a plurality of vertically spaced shelves on the lateral supports, and front and rear retention members adjacent each shelf. The wheels are supported behind the shelves such that the weight of the shelves and any items thereon will urge the bottom of the lateral supports against the floor for stable support. The display rack may also include side retention members adjacent each shelf and a releasable, pivotable header support on the upper rear of the display assembly to provide support for an advertising display above the shelves.

15 Claims, 3 Drawing Sheets

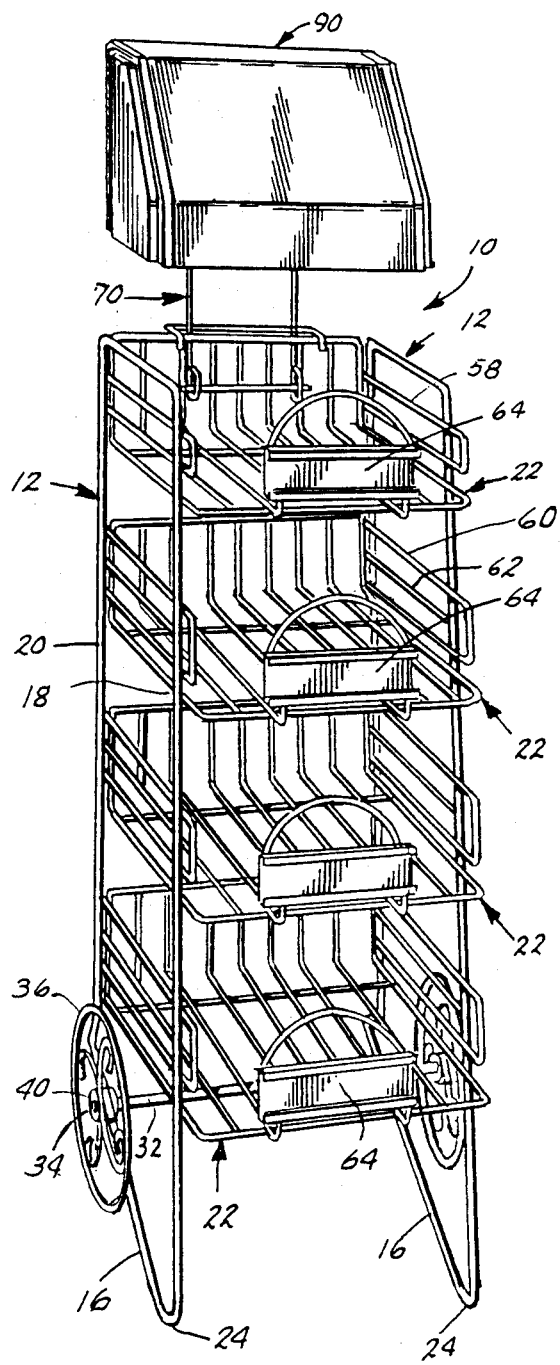
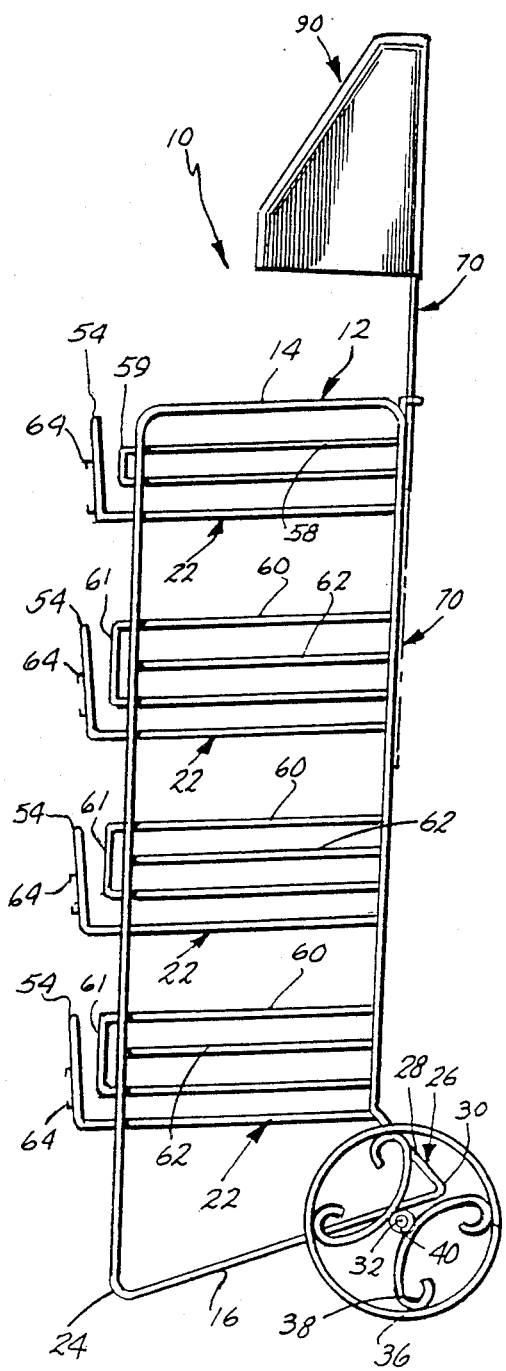
Fig. 1.
Fig. 2.

MOVABLE DISPLAY RACK

BACKGROUND OF THE INVENTION

This invention relates to display devices for various goods including groceries, baked goods, and the like, and, more particularly, to a movable product display assembly especially adapted for support and display of food items such as bread loaves and the like.

Display equipment for bakery products in a typical grocery store comprises a conventional series of stationary shelves or bins into which bread or other baked goods are placed by store personnel from baskets used to carry the product from the back storeroom. Replenishing the shelves, therefore, is fairly time consuming, as well as requiring constant surveillance to prevent the shelves or bins from becoming unattractive. Moreover, the product must be displayed in certain specific locations of the store, too often not in an optimum location for attracting attention to specials or other sale items.

Hand carts and other small vehicles have typically been used to move products from place to place in grocery and other stores. However, such carts are typically not well suited for displaying product for any length of time, for allowing easy access to the product by consumers, or for providing support for different product types. For example, various carts can be used to move products to certain stationary shelf locations in the store. Some of these four-wheeled carts include platforms for carrying boxes or other product containers. Others are two-wheeled carts having a platform adjacent the floor for sliding under and lifting a series of vertically stacked containers such as beverage crates when the cart is tipped back. Neither of these carts, however, fulfills the noted display, access and support functions while providing mobility and ease in product transport within a store.

Accordingly, the need has been apparent for a movable display which allows loading of product into the display in one area and movement to another area of a store, provides space for support of different variations of product in a pleasing and conveniently accessible manner, and yet is strong, durable and stable when placed in high consumer traffic areas of a store.

SUMMARY OF THE INVENTION

The present invention provides a movable display rack assembly especially adapted to permit loading of product such as bread and other food items in one area of a store followed by movement of the loaded rack assembly to another store location for organized, pleasing display of various products in a manner which allows convenient access to the goods by the consumer.

In one form, the display rack assembly includes a pair of spaced, generally upright, lateral supports, each support including front and rear legs and top and bottom bars. The front legs are longer than the rear legs. Each of the bottom bars slopes downwardly and forwardly to a floor engaging portion beneath its respective front leg. A pair of spaced wheels is rotatably mounted, one adjacent the bottom end of each rear leg. A plurality of vertically spaced shelves are mounted between the lateral supports. Side retention elements are included on the legs adjacent to and spaced above each shelf for retaining items at the sides of the shelves. In addition, rear retention elements extend adjacent the rear legs and adjacent and above each shelf for retaining items at the rear of the shelves. The shelves are supported in front of the wheels such that the weight of the shelves and any items thereon will urge the floor engaging leg portions toward the floor or other support surface. The assembly is tiltable off the floor engaging portions for movement on the wheels.

Preferably, the wheels are spaced rearwardly of the rear legs to provide increased weight on the front legs and greater stability to hold the assembly firmly on the floor or support surface.

In variations of the display assembly, an advertising header may be spaced above the top bars of the lateral supports on a pivotable header support secured at the rear of the top shelf. The header support is pivotable between an upright position extending above the top bars and a lowered position extending downwardly along the back of the assembly.

Also, the shelves may be formed as units from spaced rods or wire members such that each shelf is generally L-shaped and integrally includes in one assembly the rear retention portion, a front retention portion and the shelf. These units may be mounted between the lateral supports and adjacent side retention elements with the shelves sloping forwardly and downwardly for pleasing, convenient product display.

Accordingly, the invention enables bread, baked goods, or other products to be preloaded into the display in a location out of the main retail area of the store, and quickly wheeled on the very display itself into the retail area. The display can be placed at any desired location in the store, making optimum use of the space. A partially empty display can be immediately replaced with a fully loaded one for optimum appeal to the customer and in a minimum amount of time.

A plurality of the display units can even be loaded elsewhere than at the store, e.g., at the bakery itself, loaded onto trucks for transport to the store, and unloaded as units ready for movement from a temporary storage area out of the retail area into the retail area as necessary.

The display assembly is highly maneuverable, lightweight and relatively inexpensive to fabricate. The positioning of the wheels at the lower rear of the assembly with the shelf units positioned in front of the wheels causes the weight of the shelves and any products thereon to urge the lateral supports downwardly against the floor or support surface such that the assembly is stable and not easily knocked over in high traffic areas. Moreover, product labels can be placed on the front retention elements on each shelf so that variations of the product can be displayed on various of the spaced vertical shelves. In addition, the advertising header above the top shelf provides a highly visible display area for product names and other information.

These and other objects, advantages, purposes and features of the invention will become more apparent from a study of the following description taken in conjunction with the drawings.

BRIEF DESCRIPTION OF THE DRAWINGS

FIG. 1 is a front perspective view of the display rack assembly of the present invention incorporating an advertising header above the top shelf;

FIG. 2 is a right side elevation of the display rack assembly of FIG. 1;

DESCRIPTION OF THE PREFERRED EMBODIMENT

Figure 3:
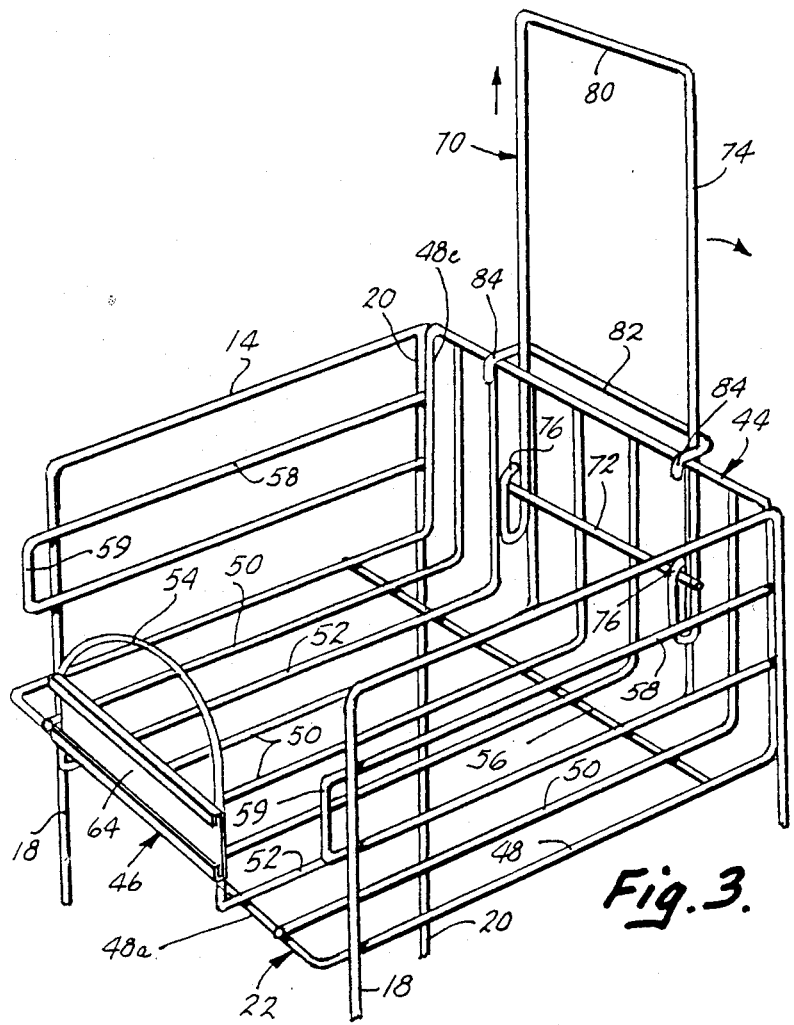
FIG. 3 is an enlarged, perspective view of the upper portion of the display rack assembly with the advertising header removed illustrating the pivotable header support in its upright position.

Referring now to the drawings in greater detail, FIGS. 1 and 2 illustrate a preferred form 10 of the movable display rack assembly of the present invention. Display assembly 10 includes a pair of spaced, trapezoidal, lateral supports 12 which are identical to one another and include a top bar 14, bottom bar 16, and front and rear legs 18, 20 respectively. Preferably, lateral supports 12 are formed from ¼ inch steel rod or wire having a circular cross section. However, other sized rod having different cross-sectional configurations may also be used. Lateral supports 12 secure therebetween a series of four vertically spaced shelf units 22 on which product including bakery goods such as bread loaves and the like may be assembled, stored and displayed for purchase in a grocery or other store. An advertising header 90 is spaced above the topmost shelf 22 to provide a highly visible area on which product designations and other indicia may be imprinted or attached. A pair of spaced wheels 36 are rotatably mounted at the lower rear of the assembly such that the rack assembly may be tilted back and wheeled about from place to place within a store.

As will be best seen from FIG. 2, front legs 18 are longer than rear legs 20. Front and rear legs 18, 20 are parallel to one another but extend generally upwardly and slightly rearwardly with respect to the vertical. In addition, top bars 14 slope slightly downwardly and forwardly and are generally parallel to the shelf area of shelf units 22. Bottom bars 16 slope downwardly and forwardly from a position at the bottom end of rear legs 20 to the bottom end of longer front legs 18. Each bottom bar 16 joins its respective front leg 18 at the forward lower end of the assembly below the front leg to form a floor engaging portion or area 24.

A rearward extension 26 is provided at the bottom end of each rear leg 20 as shown in FIG. 2. Each rearward extension 26 includes a downwardly and rearwardly sloping diagonal rod or bar 28 which joins bottom bar 16 at apex 30. The rearward extension 26 provides an additional area spaced rearwardly from the position of rear legs 20 on which axle 32 is mounted by welding (FIGS. 1 and 2). Axle 32 extends across the width of the display assembly. The ends of axle 32 extend outwardly from the sides of the display assembly and receive wheels 36 formed from shaped wire or rod and having configured spokes 38 between which is secured a hollow hub 40 received over the end of axle 32. Wheels 36 may thus rotate on hubs 40 about the stationary ends of axle 32 and are preferably held in place by end caps 34 or similar fastening devices at the ends of the axle.

As will best be understood from FIGS. 1 and 3, shelf units 22 each comprise a unitary assembly formed from steel rod or wire of circular cross section preferably of ⅛ inch. Each shelf unit 22 includes a shelf area or portion 42, a generally upright rear retention portion or back 44, and a front retention portion 46. Shelf units 22 are L-shaped and formed by an outer peripheral rod or wire 48 which outlines the entire shelf and back by extending around the entire shelf area 42 and upright back or rear portion 44. A series of L-shaped rods or wires 50 are welded between the rod portion 48a at the front edge of the shelf and rod portion 48b at the top edge of the rear retention portion 44 at spaced positions across the width of the shelf unit. Shelf area 42, and thus rods 50, extend forwardly beyond the front surface of front legs 18 such that the shelf protrudes beyond the front of the lateral supports (FIG. 2). The second rod or wire 52, when counting in from each lateral edge of each shelf unit, extends beyond front edge rod 48a and is bent upwardly into a curve extending continuously to the opposite wire rod 52 adjacent the opposite edge of the shelf unit Bent rod 54 forms the front retainer member which holds the product such as baked bread loaves or the like on the lower shelf portion 42 atop wire rods 50, 52. Likewise, the upwardly extending back or rear retention portion 44 keeps the bread or other products from falling off the rear of the shelf. A support rod 56 is welded under rods 50, 52 and extends laterally across each shelf unit forwardly of the rear shelf edge for additional support.

In order to retain product such as baked goods on the shelf area 42 at the sides of the shelf, side retaining members or elements 58, 60 and 62 are welded or otherwise secured to the inside surfaces of lateral supports 12 as shown in FIGS. 1–3. Side retaining member 58 is a bent, U-shaped steel rod or wire spaced between top bar 14 of lateral support 12 and the shelf area 42 of top shelf 22 (FIG. 3). Side retaining member 58 is positioned between and welded to rear leg 20 and the upright portion 48c of peripheral rod 48 at the rear portion of the shelf unit. Front end 59 of side retaining member 58 extends forwardly beyond front leg 18 a distance slightly less than the forward extent of shelf 22 (see FIG. 2).

Adjacent each of the other shelf units 22 below the top shelf at either lateral edge thereof are side retaining members 60, 62 (FIGS. 1 and 2). Side retaining members or bent rods 60 are similar to retainer 58 but are taller and extend from rear leg 20 beyond front leg 18 to front ends 61 the same distance as retainer 58. Spaced in the center of retainers 60 and extending between rear leg 20 and front leg 18 is a single side retaining member or rod 62. The side retaining members or elements 58, 60, 62, therefore, confine the product atop each shelf area 42 on rods 50, 52 and between front retainer 46 and rear retainer 44 to prevent the product from falling from the rack assembly. Ends 59, 61 of side retaining members 58, 60 prevent product on shelves 22 from slipping out between front retainers 54 and front legs 18.

As will be seen from FIG. 2, top bars 14, side retaining members 58, 60, 62 and rods 50, 52 of shelf area 42 are all parallel to one another and slope slightly downwardly and forwardly from positions at the rear leg 20. Such forward and downward slope properly displays the bake goods such as bread loaves or other items for easy viewing and access by consumers passing by the rack assembly in a store. Front retainers 54 extend upwardly and slightly forwardly a distance approximately one-half that between adjacent shelf areas 42 to provide appropriate access between the shelves for grasping and removing products from the shelves.

Figure 4:
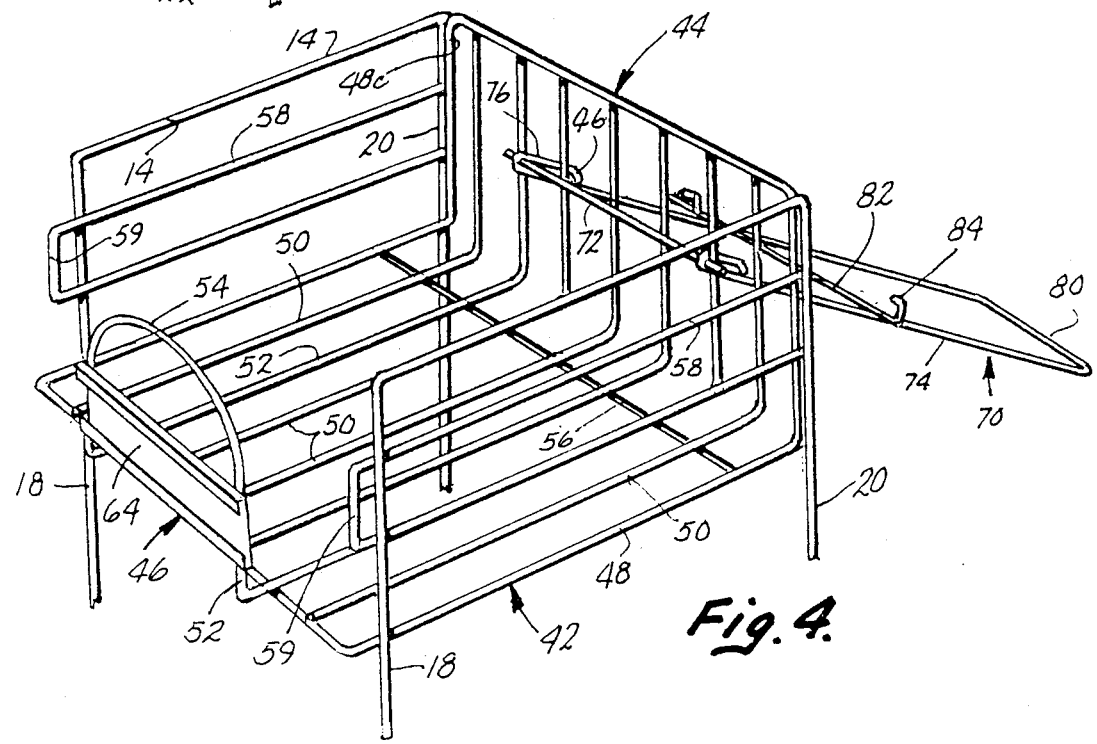
FIG. 4 is an enlarged, perspective view of the upper portion of the display rack assembly similar to FIG. 3 but with the pivotable header support in lowered position.
Figure 6:
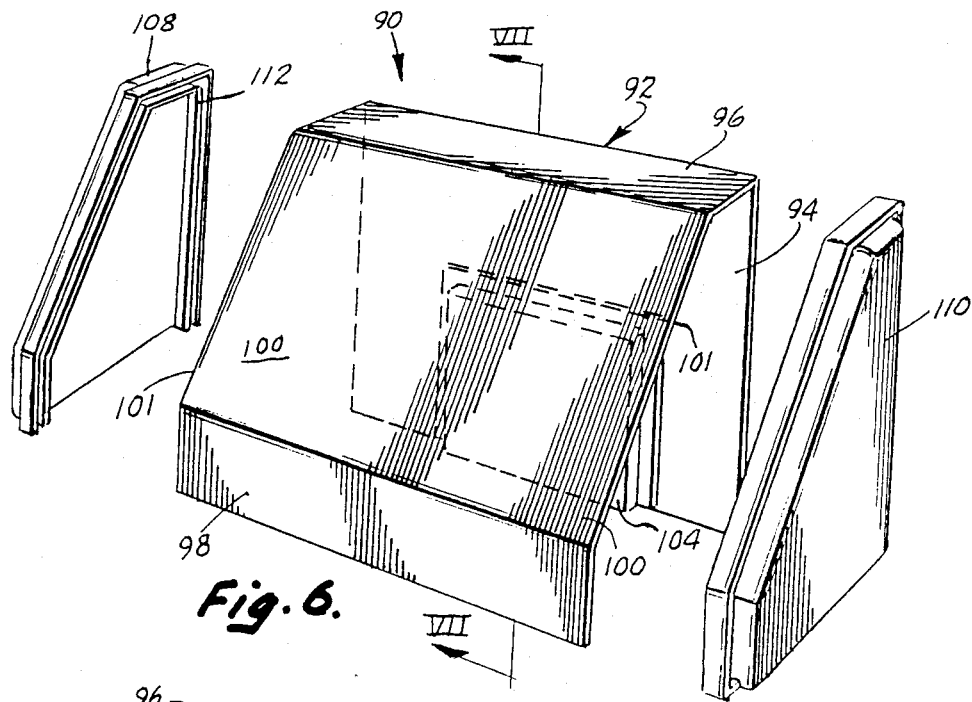
FIG. 6 is an exploded, perspective view of the advertising header adapted to be supported on the pivotable header support at the top of the display rack assembly.
Figure 7:
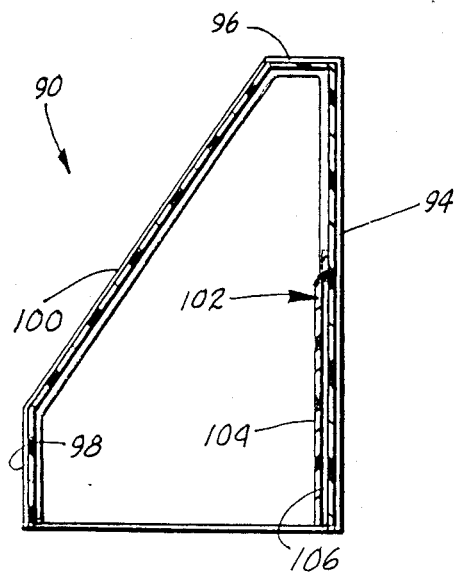
FIG. 7 is a sectional side elevation of the advertising header taken along plane VII—VII of FIG. 6.
Figure 5:
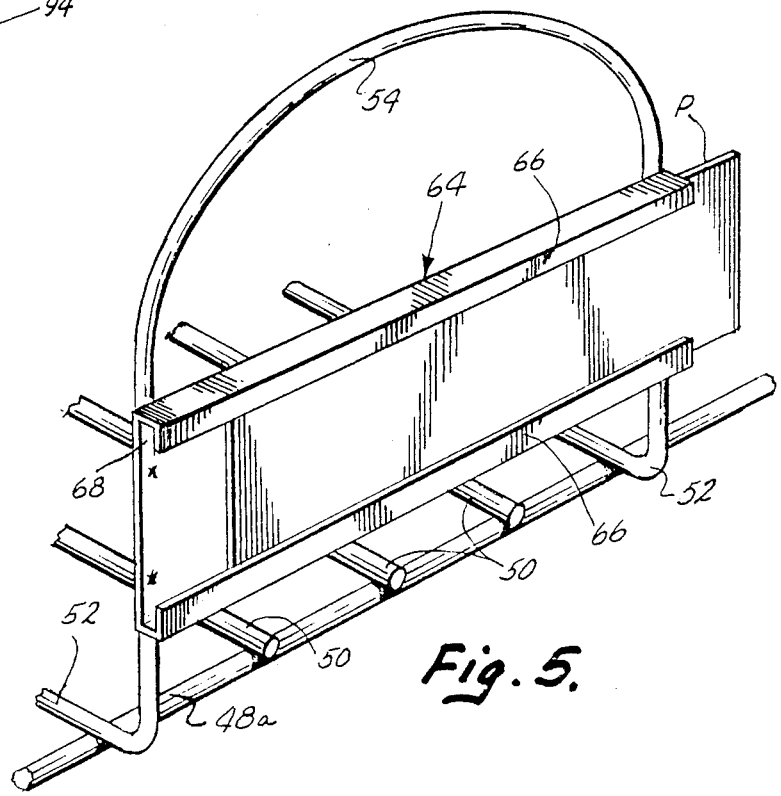
FIG. 5 is an enlarged, fragmentary, perspective view of the front retention member included on each shelf, such retention member including a card/paper holder for displaying product or other information thereon.

As is also shown in FIGS. 1-4, each front retainer 54 includes a card/paper holder 64 which extends laterally across the front retainer approximately in the middle of each shelving unit. As is best seen in FIG. 4, each card/paper holder 64 includes a pair of inwardly facing, L-shaped flanges 66 which form a recess 68 for receiving a rectangular card or other paper P on which indicia such as advertising, trademarks, pricing or other product information may be placed and displayed. The card or paper P may be slid into and out of recess 68 from either end of card/paper holder 64 for modification or changing as necessary.

As is best seen in FIGS. 3 and 4, a pivotable header support 70 is secured to the rear or back portion 44 of top shelf unit 22 in order to support advertising header 90 as mentioned above. The uppermost rear or back retention member 44 includes a generally horizontally extending, bar or wire rod 72 welded to the exterior surface of rods 50, 52 in the middle of the back or rear retainer area. A U-shaped header support member 74, preferably formed from ⅛ to ¼ inch steel rod or wire, is pivotably and slidably secured around bar 72 by means of reverse bends formed in wire ends 76 forming slots 78 in which bar 72 may slide. The closed end 80 of U-shaped support member 74 extends upwardly. Another formed wire rod 82 is welded to the exterior of U-shaped member 74 and is bent forwardly and downwardly to include hooks 84 adjacent either side of the support member for engaging the inside surface of top rod or bar 48b when support member 74 is in its upright position.

In order to pivot header support 74 from the upright position shown in FIG. 3 to its lowered position shown in FIG. 4 and in phantom in FIG. 2, top bar 80 is grasped and lifted such that ends 76 with slots 78 are lifted until rod 72 engages the inside ends of slots 78. Simultaneously, hooks 84 are released from the inside surfaces of bar 48b. Support member 74 may then be pivoted rearwardly as shown by the arrow in FIG. 3 and in FIG. 4 and lowered such that it extends along the back surface of the display rack as shown in FIG. 2. Typically, pivotable support member 74 is lowered during shipment or transportation of the display rack assembly from store to store. It may also be lowered to facilitate loading of the top shelf with various products or if use of advertising header 90 is not required.

Secured atop pivotable support member 74 is the advertising header or display 90 best seen in FIGS. 1, 2, 5 and 6. Advertising header 90 includes a molded thermoplastic body 92 having a back panel 94, top panel 96, front panel 98 and a diagonal display surface 100 extending between top panel 96 and front panel 98. The bottom of body 92 is open. A molded panel 102 is adhered to the inside surface of back 94 generally in the center of the back panel. Panel 102 includes an offset area 104 spaced from the inside surface of back 94 forming a narrow pocket or socket 106 which is slightly larger than the diameter of the wire or rod forming U-shaped pivotable header support 74. The closed end 80 of the U-shaped header support 74 is slid into the open bottom of socket 106 until it engages the closed end of the socket to retain advertising header 90 in place as shown in FIGS. 1 and 2.

The open ends of body 92 are closed by molded end panels 108, 110 each of which includes a molded slot or channel 112 which follows the contour of the end edge 101 of body 92. End edges 101 of body 92 are adhered in channels 112 by a suitable adhesive. When assembled as described above, advertising header 90 provides front, rear and end surfaces suitable for imprinting or attachment of various advertising or product information concerning the items to be supported and displayed on display rack assembly 10. When supported on assembly 10, the open bottom of advertising header 90 is spaced above top bars 14 sufficiently to allow insertion and removal of items from the top shelf over front retainer 54. Moreover, front panel 98 is positioned approximately half way between front and rear legs 18, 20, respectively, further allowing access to the top shelf support area. The advertising header may be easily slidably attached or removed from the pivotable header support 74 merely by sliding or withdrawing the header support 74 into or from socket 106.

Accordingly, it will now be understood that movable display rack assembly 10 includes a series of shelves each of which ma be used to support various products or items for display and sale in retail or other stores and which allows loading and movement of the display rack from place to place within the store in a convenient manner. As seen in FIG. 2, the shelves are supported in the display rack in front of the support position of axle 32 and wheels 36 such that the weight of the rack and shelves, together with any products or items supported on the shelves, urges the display rack downwardly urging the floor engaging areas 24 against the floor or other support surface such that the display is stably supported in four-point contact with the floor on wheels 36 and floor engaging supports 24. However, when movement of the display rack is desired, it need merely be tilted and rotated about axle 32 and wheels 36 to lift the floor engaging areas 24 away from the floor or support surface such that it can be pushed or pulled to a different position. During such movement, the rear, front and side retainer elements maintain the products or items supported on the shelf portions 42.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. A movable display assembly for products including bakery goods or the like comprising:
   a pair of spaced, generally upright, lateral supports, each support including front and rear legs, a top bar and a bottom bar, said front legs being longer than said rear legs, each said bottom bar sloping downwardly and forwardly to a floor engaging portion below its respective front leg;
   a pair of spaced wheels, one wheel rotatably mounted adjacent the bottom end of each rear leg;
   a plurality of vertically spaced shelves mounted between said lateral supports;
   side retention means on said legs adjacent to and spaced above each shelf for retaining items on said shelves at the sides thereof; said side retention means and shelves each extending beyond the front surface of said front legs of said lateral supports;

front retention means on each of said shelves for retaining items on said shelves at the front thereof; said front retention means being mounted on each said shelf at a position spaced forwardly of said front legs;

rear retention means extending adjacent said rear legs and adjacent and above each shelf for retaining items on said shelves at the rear thereof;

said shelves being supported in front of said wheels such that the weight of said shelves and any items thereon will urge said floor engaging leg portions toward the floor or other support surface; said assembly being tiltable off said floor engaging portions for movement on said wheels.

2. The display assembly of claim 1 wherein each of said shelves slopes downwardly and forwardly from a position at said rear legs of said lateral supports.

3. A movable display assembly for products including bakery goods or the like comprising:

a pair of spaced, generally upright, lateral supports, each support including front and rear legs, a top bar and a bottom bar, said front legs being longer than said rear legs, each said bottom bar sloping downwardly and forwardly to a floor engaging portion below its respective front leg;

a pair of spaced wheels, one wheel rotatably mounted adjacent the bottom end of each rear leg;

a plurality of vertically spaced shelves mounted between said lateral supports, each of said shelves sloping downwardly and forwardly from a position at said rear legs of said lateral supports;

side retention means on said legs adjacent to and spaced above each shelf for retaining items on said shelves at the sides thereof; said top bar and side retention means being parallel to one another and to said shelves;

front retention means on each of said shelves for retaining items on said shelves at the front thereof;

rear retention means extending adjacent said rear legs and adjacent and above each shelf for retaining items on said shelves at the rear thereof;

said shelves being supported in front of said wheels such that the weight of said shelves and any items thereon will urge said floor engaging leg portions toward the floor or other support surface; said assembly being tiltable off said floor engaging portions for movement on said wheels.

4. The display assembly of claim 3 wherein said front and rear legs are parallel to one another and slope upwardly and rearwardly.

5. A movable display assembly for products including bakery goods or the like comprising:

a pair of spaced, generally upright, lateral supports, each support including front and rear legs, a top bar and a bottom bar, said front legs being longer than said rear legs, each said bottom bar sloping downwardly and forwardly to a floor engaging portion below its respective front leg;

a pair of spaced wheels, one wheel rotatably mounted adjacent the bottom end of each rear leg;

a plurality of vertically spaced shelves mounted between said lateral supports, each of said shelves sloping downwardly and forwardly from a position at said rear legs of said lateral supports;

side retention means on said legs adjacent to and spaced above each shelf for retaining items on said shelves at the sides thereof;

front retention means on each of said shelves for retaining items on said shelves at the front thereof;

rear retention means extending adjacent said rear legs and adjacent and above each shelf for retaining items on said shelves at the rear thereof;

said side retention means and shelves each extending beyond the front surface of said front legs of said lateral supports; said front retention means being mounted on each said shelf at a position spaced forwardly of said front legs;

said shelves being supported in front of said wheels such that the weight of said shelves and any items thereon will urge said floor engaging leg portions toward the floor or other support surface; said assembly being tiltable off said floor engaging portions for movement on said wheels.

6. The display assembly of claim 2 wherein each of said shelves is an L-shaped unit with said rear retention means joined integrally with said shelf; said units each including a plurality of spaced rods extending continuously from said rear retention means to and along said shelf with a support rod extending across and under said spaced rods; said side retention means including a plurality of spaced rods extending between said front and rear legs adjacent each side of each of said shelves.

7. The display assembly of claim 1 wherein said front retention means on each shelf include a retention element extending laterally across the front of said shelf and a card/paper retainer for displaying product names, prices or the like at the front of each shelf.

8. The display assembly of claim 1 including an advertising header spaced above said top bars of said lateral supports.

9. A movable display assembly for products including bakery goods or the like comprising:

a pair of spaced, generally upright, lateral supports, each support including front and rear legs, a top bar and a bottom bar, said front legs being longer than said rear legs, each said bottom bar sloping downwardly and forwardly to a floor engaging portion below its respective front leg;

a pair of spaced wheels, one wheel rotatably mounted adjacent the bottom end of each rear leg;

a plurality of vertically spaced shelves mounted between said lateral supports;

side retention means on said legs adjacent to and spaced above each shelf for retaining items on said shelves at the sides thereof;

front retention means on each of said shelves for retaining items on said shelves at the front thereof;

rear retention means extending adjacent said rear legs and adjacent and above each shelf for retaining items on said shelves at the rear thereof;

said shelves being supported in front of said wheels such that the weight of said shelves and any items thereon will urge said floor engaging leg portions toward the floor or other support surface; said assembly being tiltable off said floor engaging portions for movement on said wheels;

an advertising header spaced above said top bars of said lateral supports; a top shelf adjacent said top bars and a pivotable advertising header support mounted on said rear retention means of said top shelf; said header support being pivotable between an upright position extending above said top bars and a lowered position extending downwardly along the back of said assembly.

10. The display assembly of claim 9 wherein said advertising header support includes a bar mounted across said rear retention means of said top shelf, a U-shaped support member, slidable pivot means pivotally and slidably joining said U-shaped support member to said bar, and releasable hook means on said U-shaped support at a position spaced from said slidable pivot means for engaging a portion of said rear retention means at a position spaced from said bar to hold said pivotable advertising header support in said upright position, but releasing said portion of said rear retention means to allow pivotal movement to said lowered position when said U-shaped support is slid upwardly on said slidable pivot means.

11. The display assembly of claim 9 wherein said advertising header is a hollow body having an open bottom and front, back and ends suitable for attaching or imprinting indicia thereon and socket means opening toward said open bottom for receiving and retaining said pivotable advertising header support therein.

12. The display assembly of claim 1 including means for spacing said wheels rearwardly of said rear legs.

13. A movable display assembly for products including bakery goods or the like comprising:
    a pair of spaced, generally upright, lateral supports, each support including front and rear legs, a top bar and a bottom bar, said front legs being longer than said rear legs, each said bottom bar sloping downwardly and forwardly to a floor engaging portion below its respective front leg;
    a pair of spaced wheels, one wheel rotatably mounted adjacent the bottom end of each rear leg;
    a plurality of vertically spaced shelves mounted between said lateral supports;
    side retention means on said legs adjacent to and spaced above each shelf for retaining items on said shelves at the sides thereof;
    rear retention means extending adjacent said rear legs and adjacent and above each shelf for retaining items on said shelves at the rear thereof;
    said shelves being supported in front of said wheels such that the weight of said shelves and any items thereon will urge said floor engaging leg portions toward the floor or other support surface; said assembly being tiltable off said floor engaging portions for movement on said wheels;
    means for spacing said wheels rearwardly of said rear legs, said means having a downwardly and rearwardly extending diagonal bar on each lateral support joining the bottom end of each rear leg to the rear end of each bottom bar; an axle mounted across said assembly on said bottom bars adjacent the rear ends thereof and spaced rearwardly of said rear legs; one of said wheels rotatably mounted on each end of said axle.

14. A movable display rack for bakery and other products comprising:
    a pair of spaced, generally upright, lateral supports, each support including front and rear legs, a top bar and a bottom bar, each said bottom bar sloping downwardly and forwardly to a floor engaging portion below its respective front leg;
    a pair of spaced wheels, one wheel rotatably mounted adjacent the junction of one of said rear legs and its respective bottom bar;
    a plurality of vertically spaced shelves mounted between said lateral supports, each shelf having a shelf portion, a rear retention portion and a front retention portion, said front and rear retention portions extending upwardly above said shelf portion only part way toward the next uppermost shelf;
    said wheels being positioned behind said shelves such that the weight of said shelves and any items supported thereon will urge said floor engaging portions toward the floor or support surface; said assembly being tiltable off said floor engaging portions for movement on said wheels;
    a top shelf adjacent said top bars and a pivotable header support mounted on said rear retention means of said top shelf; said header support being pivotable between an upright position extending above said top bars and a lowered position extending downwardly along the back of said assembly.

15. The movable display rack of claim 14 including an advertising header mounted on said pivotable header support and spaced above said top bars when said header support is in its upright position.

* * * * *